April 19, 1966　　　　R. C. COOPER　　　　3,246,608
CONVEYOR SYSTEM

Filed Jan. 13, 1964　　　　　　　　　　2 Sheets-Sheet 1

INVENTOR.
RICHARD C. COOPER
BY
Price & Heneveld

April 19, 1966   R. C. COOPER   3,246,608
CONVEYOR SYSTEM
Filed Jan. 13, 1964   2 Sheets-Sheet 2
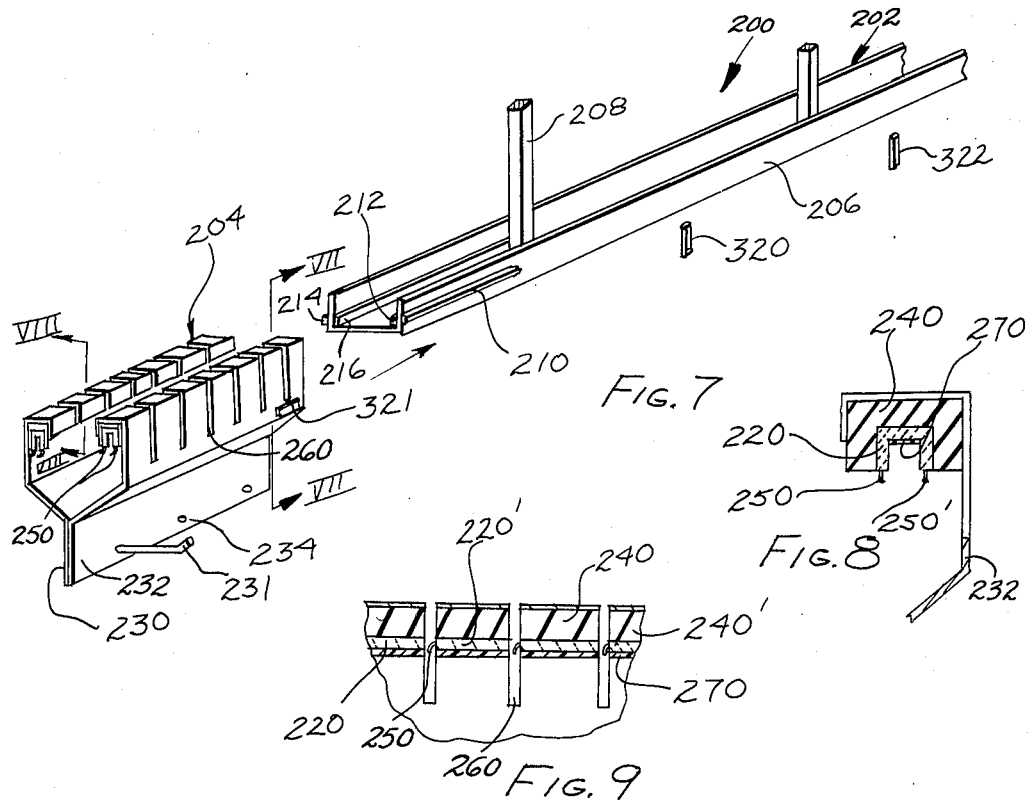
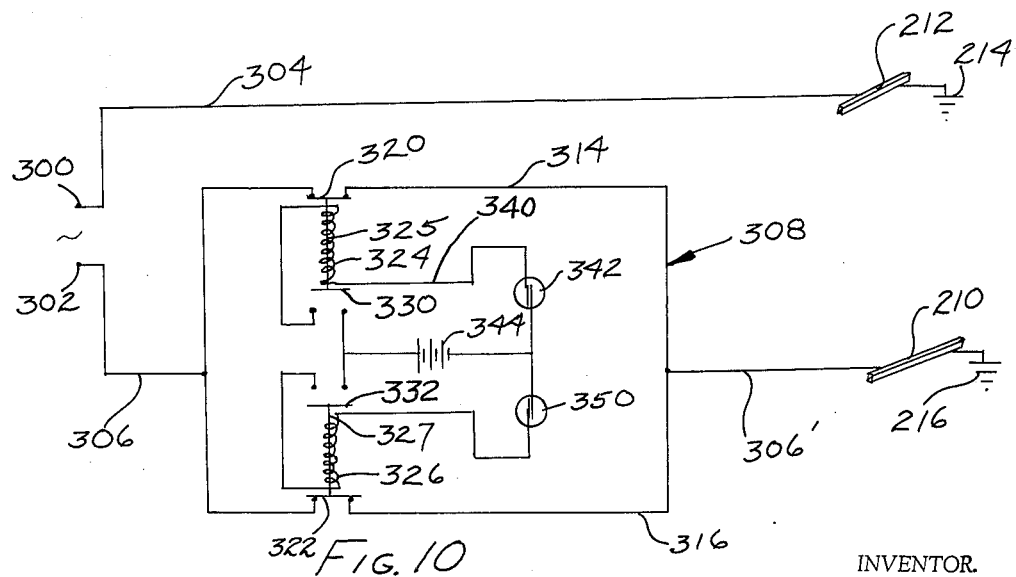
INVENTOR.
RICHARD C. COOPER
BY
Price & Heneveld United States Patent Office 3,246,608
Patented Apr. 19, 1966

3,246,608
CONVEYOR SYSTEM
Richard C. Cooper, 8125 Bailey Drive SE., Ada, Mich.
Filed Jan. 13, 1964, Ser. No. 337,474
10 Claims. (Cl. 104—134)

This invention relates to a conveying system, and more particularly to a conveying system with carriers supported on a gaseous film, thus having negligible coulomb friction.

Conventional conveyor mechanisms involve a vast variety of moving support elements, the particular nature of which depends largely upon the type and size of the articles being conveyed. Large "articles" which form part of the conveying system, e.g load-supporting carriers or pallets, or overhead trolleys, or large "articles" such as boxes or cartons are generally supported on rolling elements, or on moving belts. Smaller, lightweight articles such as clothes hangers or the like often utilize a friction slide rail since the resulting friction is small and can be tolerated. Very tiny articles such as particulate matter can be conveyed in closed, sealed conduits by a gaseous or liquid ambient carrier. Obviously, the employment of a gaseous carrier is advantageous for many reasons, including the negative coulomb friction resulting. However, it has not been very practical or economical to convey anything larger than particulate matter on a gaseous carrier heretofore.

It is therefore an object of this invention to provide a unique conveying system enabling larger articles, especially load carriers of substantial size and weight, to be conveyed in a relatively frictionless manner on a gaseous film cushion.

Another object of this invention is to provide a gaseous supported conveyor system employing recirculating carriers or containers having means for creating and sustaining a self-supporting gaseous film with respect to the track. The mechanism utilizes no rolling elements or belts. Neither is there any general sliding relationship between conveyor components.

Still another object of this invention is to provide a conveying system wherein the carriers are dynamically supported on the track means and are actuated in response to electrical power. The support system is instantly responsive to the signal to create and eliminate the dynamic fluid support. The system carriers are therefore highly responsive to external control.

It is another object of this invention to provide a dynamic gas film supported conveyor system effecting automatic regulation of the individual carrier speed at selected locations along the conveyor track.

These and several other objects of this invention will become readily apparent upon studying this application in conjunction with the drawings in which:

FIG. 7 is a perspective view of a third and preferred form of the invention;

FIG. 8 is a fragmentary, enlarged, sectional view taken on plane VII—VII of FIG. 7;

FIG. 9 is a fragmentary, enlarged, sectional view taken on plane VIII—VIII of FIG. 7; and FIG. 10 is a schematic view of a control circuit employed with the apparatus in FIG. 7.

Figure 1:
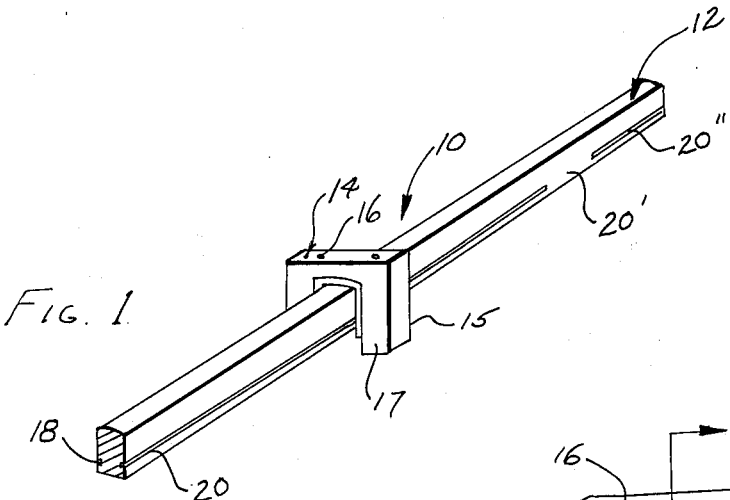
FIG. 1 is a perspective view of one form of the invention.
Figure 4:
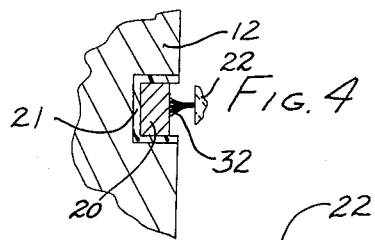
FIG. 4 is an enlarged fragmentary view of the electrical contact between the carrier and rail of FIG. 1.
Figure 2:
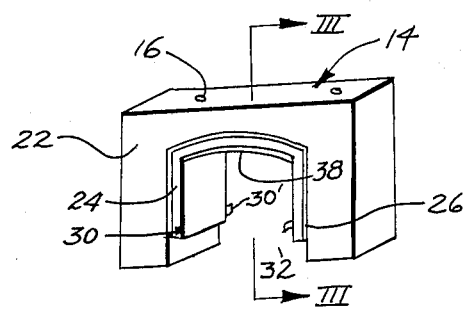
FIG. 2 is an enlarged perspective view of a carrier support for the system in FIG. 1.
Figure 3:
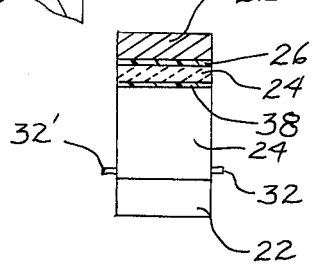
FIG. 3 is a sectional view taken on plane III—III of the support in FIG. 2.

Referring now more specifically to the drawings, the first form of the invention illustrated in FIGS. 1, 2 and 3 comprises a conveyor system 10 which includes an elongated conveyor track means 12 and carrier supports 14 to ride along the track. This carrier support may assume several different configurations. It may itself support articles, or have other containers attached thereto as through suitable connector openings 16 to support the articles. Since the track 12 may have curves in it, the axial length of the carrier support (from front 15 to back 17) is preferably small. It will be realized hereinafter that a plurality of the carrier supports may be cooperatively employed, spaced from each other, to support a carton or container in common. The carton should have flexible walls if the carrier is to move around curves in the track.

The track 12 is an elongated element having a pair of separate, insulated electrical contacts 18 and 20 which run continuously along the length of the track. These electrical contacts are associated electrically with a suitable power supply of A.C. type having a frequency at least of 50 cycles per second. Preferably this frequency is several hundred or several thousand cycle per second for reasons stated hereinafter. Each contact strip is recessed into and electrically insulated from the track by insulation 21 such as a potting resin, e.g. polyepoxy. These electrical contacts may include longitudinal cutout portions as at 20' along certain portions of the track to momentarily suspend electrical power to the carrier unit. The separated strip elements are in electrical contact with each other, however, to complete the circuit. This may be done by embedding the strip portion not to be contacted under the potting compound for the short distance.

The carrier unit 14 comprises a support. It is supported by an element 22 generally of inverted U-shaped configuration. It may be of metal, rubber, plastic, or other material sufficient to support a desired load thereon.

Mounted within the central portion of the support is an inverted U-shaped pulser sleeve 24. The pulser sleeve is an electrostrictive element, preferably a piezoelectric ceramic element, for example, of the type known as PZT-4 manufactured and sold by Clevite Corporation. It is a ceramic containing lead, zirconium and titanium and, as a piezoelectric material, is capable of physically expanding and contracting in three dimensions under the stimulus of an electrical impulse. The piezoelectric ceramic 24 is insulated from the support. Since it physically pulses in three dimensions, it needs a resilient cushion. It must be attached to support 22. Therefore, a potting compound 26 of slight compressibility, good adherence, and electrical insulation qualities is employed between it and its support. This potting compound may, for example, by any of several materials, such as an epoxy resin or the equivalent.

Electrical input impulses are made to this element on both sides of the track by a pair of electrical contact brushes 30 and 30' on the front and back of one side, and 32 and 32' (FIG. 3) on the front and back of the other side. Thus, flexible brushes 30 and 30' contact elongated electrical contact strip 18, and brushes 32 and 32' contact electrical contact strip 20. With the application of an attenuating current, the piezoelectric element physically pulses at the frequency of the current.

The special clearance provided between the sides or legs of this piezoelectric element and the sides of the rail 12 is in the range of a few ten-thousandths to a few thousandths of an inch, usually around 0.0005 to 0.002 inch. This is varied to suit the particular change in dimension of the pulsing element so that the element never fills up the space between it and the rail. In this clearance is a compressible gas film, usually air. The piezoelectric element normally expands and contracts a few ten-thousandths to a few thousandths of an inch, depending upon composition and size. This will be varied with the type and size of conveyor, as well as the load applied.

The underside of the piezoelectric element is in contact with the rail when at rest and rises above the rail a few thousandths of an inch during operation. Preferably, the underside of the top portion of element 24 includes a low frictioning bearing material such as a nylon or Teflon coating 38. This enables a moving carrier to slide easily along the rail when electrical power is stopped, thereby preventing abrupt stops while the carrier is being conveyed.

Operation of first form

To operate the mechanism in FIG. 1 for conveying elements along on a gaseous film, a plurality of the carriers or carrier supports 14 are mounted on rail 12 by setting them in position. The flexible brushes then contact their elongated power contact strips which are powered by an A.C. source. As power is applied to strips 18 and 20 and thus to brushes 30, 30', 32 and 32' to the opposite sides of piezoelectric element 24, it physically pulses. Normally it is selected so that its pulsation expansions are about half the clearance between the carrier and rail. Since it pulses in all three dimensions simultaneously, it will have a vertical pulsing effect on its top portion and a lateral pulsing effect on its leg portions. This causes rapid compression and decompression of the compressible gaseous film of air in the clearance space between the rail and carrier. Initially, surface 38 is in contact with the top of the rail. The pulsing causes the carrier to lift off the rail and create the intermittently compressed gaseous film, which becomes self-sustaining under the dynamic effect. As the gaseous film is compressed and decompressed, the carrier is prevented from again contacting the rail until the power is discontinued. This principle has been found to be capable of lifting substantial loads, so that even large articles can be conveyed. The particular size of the pulsing element will vary depending upon the weight to be conveyed. The gas within the few thousandths clearance between the carrier and rail does not escape or move out of the clearance upon compression, but rather is compressed and decompressed so rapidly that it has no chance to move laterally. The amount of movement of gas out of and back into the clearance is negligible. Therefore, no sealing effect along the edge of the clearance is necessary. The carrier therefore becomes supported on a film of air, so that substantially no coulomb friction results when it moves along the rail. Also, it is maintained laterally aligned and spaced from the opposite sides of the rail by the lateral dynamic pulsing. Very little force is needed to move the carrier along. If the unit is used on a gravity conveyor, for example, it will maintain its speed readily, with a very slight slant, with substantially no coulomb friction resulting. Alternatively, it may be powered by various means, a complete listing of which would be superfluous and would not add to the inventive concept. Even a slight manual push of the carrier along the track will send it a substantial distance and may be entirely satisfactory, depending upon the type of operation involved.

It will be realized that at the section 20' of the electrical contact strips, the carrier will temporarily lose its electrical power contact supply since the brushes do not touch the strips and the circuit is broken temporarily. Consequently, as soon as the brushes reach this area, the piezoelectric element stops pulsing. The carrier then slides along on its lubricous bearing surface 38. This feature may be used to stop carriers, or to slow down carriers in particular areas where they tend to gain excessive speed. After passing this area it again is actuated to move on to the next destination of its film support. These areas may be of predetermined length so that the carrier will be slowed to a predetermined speed when it reaches the end of the strip gap. These are useful, for example, on steep slanted portions or the like.

Second form

Figure 5:
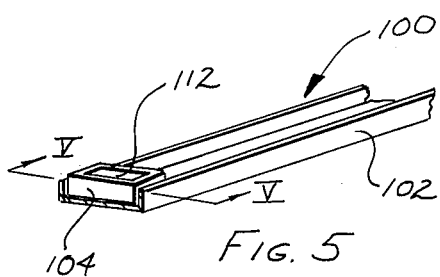
FIG. 5 is a fragmentary perspective view of a second form of the invention.
Figure 6:
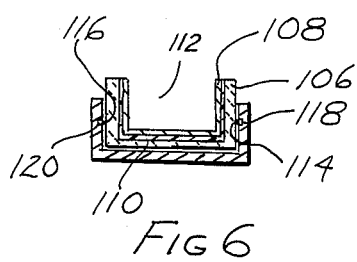
FIG. 6 is a sectional view taken on plane V—V of FIG. 5.

In FIGS. 5 and 6 a second form of the apparatus is shown. This conveying system 100 includes a track means 102 and a different type of carrier means 104. In this instance, the lateral support is achieved by upward protrusion of walls of the track. Thus the track is basically U-shaped in configuration, having its legs protruding upwardly from its base. The carrier which is shown in the form of a small box 104 is placed within this track, to have a side clearance of a few thousandths of an inch on both sides. The exterior of the carrier includes a jacket 106 of electrostrictive material such as the piezoelectric ceramic described above. This is supported on an internal support shell 108, and attached thereto by a compressible, potting, electrically insulating compound 110. The carrier has a load supporting space 112.

Extending laterally from piezoelectric element 106 is a pair of electrical contact brushes 114 and 116. These are positioned to contact a pair of elongated contact strips 118 and 120 affixed to and electrically insulated from the track. The principle of operation of this form of the invention is substantially the same as that described with respect to the first form of the invention.

Third form

In FIGS. 7 through 9 is shown a third form of the invention wherein the structure simulates an overhead trolley type mechanism. In this instance, the conveyor system 200 includes an overhead support rail 202 and an elongated carrier mechanism 204. This rail 202 may take the form of a U-shaped element 206 suspended on suitable vertical supports 208 from the ceiling, wall or floor. Along opposite sides of each of the legs of the element 202 is a pair of electrical contact strips 210 and 212 on one leg and 214 and 216 on the other. Contact strips 210 and 212 supply A.C. power to a plurality of adjacent, spaced, piezoelectric elements 220, 220', etc. along opposite sides of carrier 204. This carrier basically comprises a pair of like, facing, metal supports 230 and 232 which are attached together as by welding. The lower convergent legs of these supports include connector means such as threaded openings 234 to mount any suitable hangers 231, pegs, hooks or the equivalent for suspending articles.

The upper ends of these two supports are spaced from each other to cooperate with the spaced legs of the rail. These upper ends project upwardly, inwardly toward each other, and then downwardly to provide inverted U-shaped upper support elements. Mounted within these upper supports, one of which is shown in enlarged form in FIG. 8, is the plurality of spaced piezoelectric pulsing units 220, 220', etc. Each of these is attached to a support segment of elements 230 and 232 by a suitable bonding, potting, resilient, and electrically insulating compound 240. Preferably this is of a resilient material such as rubber to flex readily when curves are encountered on the rail. These bonding elements may be separated from each other as illustrated in FIG. 9 by elements 240, 240', etc. or may be one continuous unit interconnecting the segments of the supports and the individual piezoelectric elements.

Each of the pulser elements includes electrical brush contacts, a few of which are shown at 250 and 250'. These brushes may be arranged in any suitable relationship as long as they provide power to the opposite portions of each piezoelectric element to cause it to pulse. The elongated configuration of the support element is segregated into segments by vertical slits 260 to enable the unit to more readily flex and accommodate curves in the track. It is conceivable that this carrier might be made more flexible by forming it out of a more flexible material such as a plastic or rubber substance with just sufficient rigidity to be capable of supporting the load intended to be carried, and of retaining its configuration to maintain the piezoelectric elements in adjacent relationship to the legs of the track. It should also be susceptible to being manufactured readily under mass production conditions. The degree of flexibility required for each particular type of carrier will vary, of course, with the surroundings and the configuration of the track with which it is used. These variations can be achieved by anyone skilled in this field once the principles of operation are understood.

In this form of the invention as with previous forms, preferably the underside of the piezoelectric element includes a sliding surface as of a lubricous material such as nylon or Teflon coating 270 to keep friction at a controlled low value when power is released from the unit as it is moving along the track.

The operation of this unit is basically similar to that previously described with respect to the prior units. That is, when A.C. electrical power is applied to electrical strips 210, 212, 214 and 216, the brushes pick up the alternating signal to cause the piezoelectric elements to pulse at a high frequency. This forms and sustains a dynamic, compressed-expanded, gaseous carrier film between the carrier and rail surfaces, to vertically suspend the carrier above the rail and retain its lateral relationship with respect thereto as it moves.

*Speed control system*

In order to control the speed of this unit as it moves along the conveyor, for example on a gravity conveyor, an additional control mechanism illustrated by the circuit diagram in FIG. 10 may be employed.

Referring to FIG. 10, the source of alternating power is supplied through contacts 300 and 302 to lines 304 and 306. Line 304 may be associated directly with the contact strips, for example 212, on the conveyor rail. From there it is grounded through a suitable ground 214. Line 306 on the other hand includes a control circuit 308 therein before it terminates by contacting its rail such as rail 210, and going to ground 216.

This control circuit 308 includes two sublines 314 and 316 in electrical parallel with each other from portion 306 to portion 306' of the line. In each of these is a normally closed switch, switches 320 and 322, respectively. Each of these switches is controlled by windings 324 and 326 respectively. The switches are opened by shifting them away from their respective contacts. Also associated with these windings is a second switch, i.e. switches 330 and 332 for windings 324 and 326 respectively. Switches 320 and 330 have a common core 325 in winding 324. Switches 322 and 332 have a common core 327 in winding 326.

Switch 330 is in line 340 to winding 324. In series with winding 324 and switch 330 is a normally closed time delay, heat controlled switch 342. Switches 342, 330 and winding 324 are in electrical series with a source of power such as a battery 344. Likewise, switch 332 is in electrical series with winding 326 as well as in electrical series with a second normally closed, time delay, heat controlled switch 350, and battery 344. When switch 330 is closed, as by a mechanical force, and switch 320 is simultaneously opened by this force, winding 324 is energized by completing the circuit from battery 344 to time switch 342 and coil 324. Consequently, this coil is kept energized until the temperature of the time switch 342 is sufficient to cause it to open. This may be a typical bimetal switch such as the thermostat type. The time delay is precalculated to a specific value for reasons to be stated hereinafter. The same factors hold true with respect to switches 322 and 332 and time switch 350.

In operation, switches 320 and 322 are mounted along the conveyor track, as illustrated in FIG. 7, with a carefully set specified distance therebetween. These are actuated by a cam 321 mounted to each carrier. As the carrier moves along the track, cam 321 first contacts switch 320 to open it and simultaneously close switch 330. This opens parallel branch 314 of line 306, but maintains branch 316 closed. If the conveyor is moving within a predetermined speed, it will take a predetermined time to pass between switches 320 and 322. Accordingly, the time switch 342 is calculated to open just prior to the carrier reaching switch 322 so that, upon release of energy through coil 324, switch 320 will reclose under the force of a bias such as a spring. Then, a moment later when cam 321 on the carrier contacts switch 322 to open it and close switch 332 to energize coil 326, the current will flow through leg 314 of the circuit. The current is therefore not disrupted while the carrier is passing, and it will receive continuous actuation. The time switch 350 will release switch 322 after a period of time to allow it to return to its closed position for the next carrier. This time switch 350 may be any suitable type which closes after an interval of time.

Regulation of speed of the carrier is achieved through this device. For example, if the carrier is moving too rapidly, it will traverse the distance between the two switches before time switch 342 has a chance to open. Consequently, since the switch 320 has been opened, and since switch 322 is subsequently opened before time switch 342 can close switch 320, current will be temporarily disrupted in the circuit since both branch lines 314 and 316 will be open. Consequently, no current can flow to strips 210 and 212 to dynamically suspend the carrier. It therefore slides along on its lubricous surfaces 270 until electrical energy is again supplied.

It will be realized that the amount of time that current is interrupted will be proportional to the excess of the carrier speed. That is, if the carrier is moving only slightly faster than it should be, time switch 342 will open shortly after the circuit is broken. Therefore, the slowing down effect by rubbing of the carrier on the rail will only be small. If, on the other hand, the carrier is moving excessively fast, it will pass the second switch quicker and a greater interval of time will occur without current before time switch 342 reopens. Thus, the current will be disrupted for a longer period of time, causing a greater dragging force on the carrier. By accurate setting of the time switch delay, of the spacing of the switches to each other, and the frictional drag on the surfaces, the speed of the carriers can be controlled very accurately.

It will be obvious to those having ordinary skill in the art that additional advantages not specifically recited herein can be found with the apparatus. Also, various other modified forms of the apparatus can conceivable be made without departing from the inventive concepts taught. For example, the circuit shown in FIG. 10 can be modified somewhat. Also, the method of powering the carriers can be varied widely. Further, it is conceivable that the dynamic pulsing elements may be on the rail instead of the moving carriers. Since this usually would involve a substantially greater expense, however, this is not normally advisable. Also, instead of electrostrictive pulsing elements, magnetostrictive elements or even hydraulically or other mechanically actuated pulsing means could be utilized to achieve a similar result, although these are not preferred. Consequently, the inventive concept is not to be limited to the specific preferred forms of the structure illustrated, but only by the scope of the appended claims and the reasonably equivalent structures and methods defined therein.

I claim:

1. A conveying system comprising: track means and carrier means thereon; said carrier means and track means having cooperative surface areas closely adjacent to and at a slight clearance from each other; said carrier means having dynamic pulsing means adjacent said track surface area means capable of physically pulsing toward and away from said track means at substantial frequencies; and a compressible gas in said clearance, whereby, upon activation of said pulsing means, said fluid is repeatedly compressed and expanded to form and maintain a dynamic fluid support for said carrier means.

2. A conveying system comprising: track means and carrier means therefor; said carrier means having electrically responsive, dynamic, pulsing means capable of physically pulsing toward and away from said track means at substantial frequencies; said carrier means having surface area closely adjacent to said track means and at a slight clearance therefrom; electrical alternating power supply means along said track and cooperating electrical pick-up means on said carrier means to provide power to said pulsing means; and a compressible fluid in said clearance, whereby upon electrical activation of said pulsing means, said fluid is repeatedly compressed and expanded to form a dynamic fluid support film for said carrier means.

3. A conveying system comprising: track means and a plurality of carriers to move therealong; said tracks means having a horizontally extending surface area to provide vertical support to carriers, and at least two laterally spaced vertically extending surfaces to provide lateral positioning of carriers; each of said carriers having electrostrictive means extending closely to and at a slight clearance from said surface area and said surfaces and responsive to high frequency alternating current to pulse at high frequencies; electrical contact strip means along said track means and electrical contact brush means on each carrier electrically connected to said electrostrictive means and cooperative with said contact strip means; and a compressible gas in said clearance, whereby with pulsing of said electristrictive means on a carrier, the carrier becomes dynamically supported on said gas.

4. A conveying system comprising: tracks means and a plurality of carriers to move therealong; said track means having a horizontally extending surface area to provide vertical support to carriers, and at least two laterally spaced vertically extending surfaces to provide lateral positioning of carriers; each of said carriers having electrostrictive means extending closely to and at a slight clearance from said surface area and said surfaces and responsive to high frequency alternating current to pulse; electrical contact means along said track means, and electrical contact brush means on each carrier electrically connected to said electrostrictive means and cooperative with said contact means; a compressible gas in said clearance, whereby with pulsing of said electrostrictive means on a carrier, the carrier becomes dynamically supported on said gas; and sliding surface means on said electrostrictive means adjacent said surface area to apply controlled sliding frictional drag to said carrier when power is cut off to said electrostrictive means.

5. The system is claim 3 wherein said track means comprises a rail and each of said carriers fits over and receives said rail.

6. The system in claim 3 wherein said track means comprises a trough and said carrier includes portions fitting in said trough.

7. The system in claim 3 wherein said carrier is articulate and includes a plurality of electrostrictive elements flexibly interconnected.

8. A conveying system comprising: track means and a plurality of carriers to move therealong; said track means having a horizontally extending surface area to provide vertical support to carriers, and at least two laterally spaced vertically extending surfaces to provide lateral positioning of carriers; each of said carriers having electrostrictive means extending closely to and at a slight clearance from said surface area and said surfaces and responsive to high frequency alternating current to pulse; electrical contact means along said track means and electrical contact brush means on each carrier electrically connected to said electrostrictive means and cooperative with said contact means; a compressible gas in said clearance, whereby with pulsing of said electrostrictive means on a carrier becomes dynamically supported on the gas; and maximum speed regulating means for said carriers on said track means including first and second normally closed switch means arranged in sequence along said track means at a predetermined spacing; said switch means being in electrical parallel with each other and in electrical series from a source of power to said electrical contact means along said track; said first and second switch means each being activated by passage of a carrier to temporarily open the respective switch means; said first switch means having a time delay means to reclose after a particular time, normally before opening of said second switch if the carrier is moving within a predetermined maximum speed limit, but after opening of said second switch upon passage of a carrier moving at a speed greater than said speed limit, so that said first switch remains open until after said second switch is opened for a variable time interval dependent upon the excess speed to remove power to said electrostrictive means and cause the carrier to slide on said track means temporarily to slow it down.

9. A conveying system comprising: tracks means and a plurality of carriers to move therealong; said track means having a horizontally extending surface area to provide vertical support to carriers, and at least two laterally spaced vertically extending surfaces to provide lateral positioning of carriers; each of said carriers having electrostrictive means extending closely to and at a slight clearance from said surface area and said surfaces and responsive to high frequency alternating current to pulse; electrical contact means along said track means and electrical contact brush means on each carrier electrically connected to said electrostrictive means and cooperative with said contact means; a compressible gas in said clearance, whereby with pulsing of said electrostrictive means on a carrier, the carrier becomes dynamically supported on said gas; a maximum speed regulating means for said carriers on said track means, including sequentially operated current control means along said track means operated with passage of a carrier; said control means being responsive to a carrier moving faster than a predetermined maximum speed to temporarily disconnect power to said contact means, thereby causing said carrier to slide temporarily on said track means to slow it down.

10. A conveying system comprising: track means and a plurality of carriers supported thereby; said track means and each of said carriers being configurated to have closely adjacent, cooperative track and carrier surfaces with slight clearance therebetween; dynamic physical pulsing means between each of said carriers and said track means responsive to stimuli to repeatedly expand into and contract from said clearance; and a compressible support gas in said clearance, repeatedly compressed and expanded with said pulsing to create a dynamic lateral and vertical gaseous film support.

No references cited.

ARTHUR L. LA POINT, *Primary Examiner.*
MILTON BUCHLER, *Examiner.*